US007809828B2

(12) United States Patent
Burnett et al.

(10) Patent No.: US 7,809,828 B2
(45) Date of Patent: Oct. 5, 2010

(54) METHOD FOR MAINTAINING STATE CONSISTENCY AMONG MULTIPLE STATE-DRIVEN FILE SYSTEM ENTITIES WHEN ENTITIES BECOME DISCONNECTED

(75) Inventors: Rodney Carlton Burnett, Austin, TX (US); Paul David Mazzurana, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 11/733,819

(22) Filed: Apr. 11, 2007

(65) Prior Publication Data

US 2008/0256231 A1 Oct. 16, 2008

(51) Int. Cl.

| | |
|---|---|
| ***G06F 15/173*** | (2006.01) |
| ***G06F 15/16*** | (2006.01) |
| ***G06F 7/00*** | (2006.01) |
| ***G06F 7/04*** | (2006.01) |

(52) U.S. Cl. ....................... 709/224; 709/203; 707/781; 726/27

(58) Field of Classification Search ................. 709/203, 709/224; 707/200, 781; 726/27

See application file for complete search history.

(56) References Cited

U.S. PATENT DOCUMENTS 5,634,122 A * 5/1997 Loucks et al. .................. 707/8
5,659,682 A * 8/1997 Devarakonda et al. ........ 714/47
5,878,434 A * 3/1999 Draper et al. ............... 707/202
5,909,540 A * 6/1999 Carter et al. ................... 714/4
5,991,771 A * 11/1999 Falls et al. .................. 707/202

OTHER PUBLICATIONS

Shepler et al., "Network File System (NFS) Version 4 Protocol", RFC3530, The Internet Society, Apr. 2003, pp. 1-257.

"A method for maintaining open and data consistency state between multiple state based distributed file systems", IPCOM000024647D, ip.com, Apr. 2, 2004, pp. 1-2.

* cited by examiner

*Primary Examiner*—William C Vaughn, Jr.
*Assistant Examiner*—Ranodhi N Serrao
(74) *Attorney, Agent, or Firm*—Yee & Associates, P.C.; Matthew W. Baca

(57) ABSTRACT

A computer implemented method, data processing system, and computer program product for maintaining state consistency among multiple state-driven file system entities when the file system entities become disconnected. Responsive to a distributed file system server being disconnected from a distributed file system client, a monitor is registered with the consistency management framework (CMF) for a file system. When the CMF detects access to a file in the file system, the CMF notifies the monitor of the access to the file, and the monitor stores information about state of the file. When the distributed file system server is reconnected to the distributed file system client, information about state of the file stored in the monitor is provided to the distributed file system client.

16 Claims, 3 Drawing Sheets

300
304 DISTRIBUTED FILE SYSTEM CLIENT 1
306 DISTRIBUTED FILE SYSTEM CLIENT 2
308 DISTRIBUTED FILE SYSTEM CLIENT 3
316 DISTRIBUTED FILE SYSTEM SERVER CM CLIENT 1
STATE MATRIX 324
CMF 302
318 DISTRIBUTED FILE SYSTEM SERVER CM CLIENT 2
STATE MATRIX 326
334 QUERY (RECONCILE)
MONITOR 1 STATE MATRIX 328
NOTIFICATION 332
CONSISTENCY MANAGER 314
MONITOR 2 STATE MATRIX 330
320
322
310 PEER FILE SYSTEM SERVER 1
312 PEER FILE SYSTEM SERVER 2

100
104
SERVER
106
SERVER
102
NETWORK
STORAGE
108
110
CLIENT
112
CLIENT
114
CLIENT

206
PROCESSING UNIT
200
210
GRAPHICS PROCESSOR
202
NB/MCH
208
MAIN MEMORY
216
AUDIO ADAPTER
236
SIO
204
240
BUS
SB/ICH
238
BUS
DISK
CD-ROM
NETWORK ADAPTER
USB AND OTHER PORTS
PCI/PCIe DEVICES
KEYBOARD AND MOUSE ADAPTER
MODEM
ROM
226
230
212
232
234
220
222
224

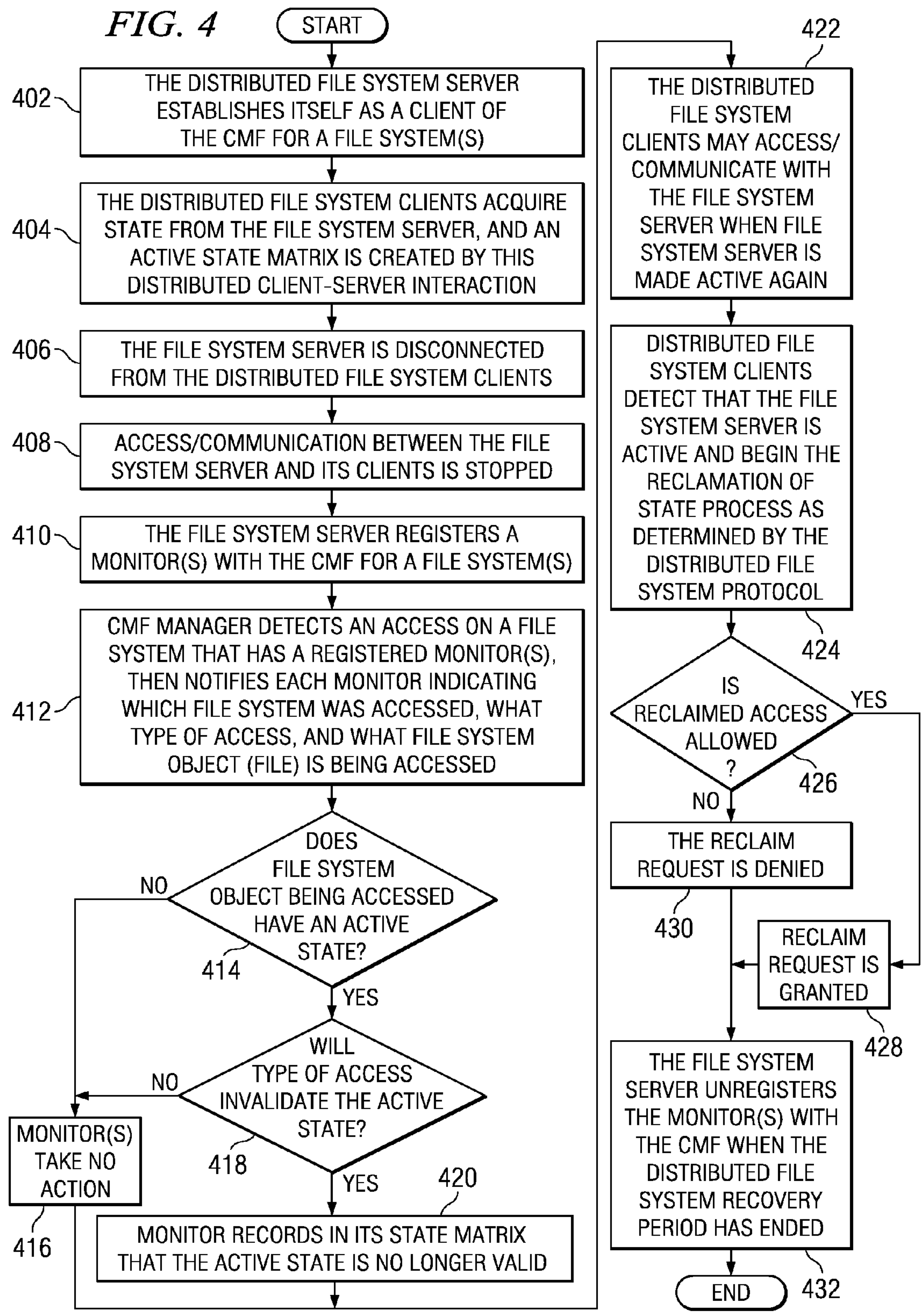
FIG. 4
START
402
THE DISTRIBUTED FILE SYSTEM SERVER ESTABLISHES ITSELF AS A CLIENT OF THE CMF FOR A FILE SYSTEM(S)
404
THE DISTRIBUTED FILE SYSTEM CLIENTS ACQUIRE STATE FROM THE FILE SYSTEM SERVER, AND AN ACTIVE STATE MATRIX IS CREATED BY THIS DISTRIBUTED CLIENT-SERVER INTERACTION
406
THE FILE SYSTEM SERVER IS DISCONNECTED FROM THE DISTRIBUTED FILE SYSTEM CLIENTS
408
ACCESS/COMMUNICATION BETWEEN THE FILE SYSTEM SERVER AND ITS CLIENTS IS STOPPED
410
THE FILE SYSTEM SERVER REGISTERS A MONITOR(S) WITH THE CMF FOR A FILE SYSTEM(S)
412
CMF MANAGER DETECTS AN ACCESS ON A FILE SYSTEM THAT HAS A REGISTERED MONITOR(S), THEN NOTIFIES EACH MONITOR INDICATING WHICH FILE SYSTEM WAS ACCESSED, WHAT TYPE OF ACCESS, AND WHAT FILE SYSTEM OBJECT (FILE) IS BEING ACCESSED
414
DOES FILE SYSTEM OBJECT BEING ACCESSED HAVE AN ACTIVE STATE?
NO
YES
418
WILL TYPE OF ACCESS INVALIDATE THE ACTIVE STATE?
NO
YES
416
MONITOR(S) TAKE NO ACTION
420
MONITOR RECORDS IN ITS STATE MATRIX THAT THE ACTIVE STATE IS NO LONGER VALID
422
THE DISTRIBUTED FILE SYSTEM CLIENTS MAY ACCESS/ COMMUNICATE WITH THE FILE SYSTEM SERVER WHEN FILE SYSTEM SERVER IS MADE ACTIVE AGAIN
424
DISTRIBUTED FILE SYSTEM CLIENTS DETECT THAT THE FILE SYSTEM SERVER IS ACTIVE AND BEGIN THE RECLAMATION OF STATE PROCESS AS DETERMINED BY THE DISTRIBUTED FILE SYSTEM PROTOCOL
426
IS RECLAIMED ACCESS ALLOWED ?
YES
NO
430
THE RECLAIM REQUEST IS DENIED
428
RECLAIM REQUEST IS GRANTED
432
THE FILE SYSTEM SERVER UNREGISTERS THE MONITOR(S) WITH THE CMF WHEN THE DISTRIBUTED FILE SYSTEM RECOVERY PERIOD HAS ENDED
END

METHOD FOR MAINTAINING STATE CONSISTENCY AMONG MULTIPLE STATE-DRIVEN FILE SYSTEM ENTITIES WHEN ENTITIES BECOME DISCONNECTED

BACKGROUND OF THE INVENTION

1. Field of the Invention

The present invention relates generally to an improved data processing system, and in particular to a computer implemented method, data processing system, and computer program product for maintaining state consistency among multiple state-driven file system entities when the file system entities become disconnected.

2. Description of the Related Art

A file system is a hierarchical structure of data in which files are stored within folders on a storage medium such as a hard disk. A part of the operating system maintains the file system and controls access to the files in the file system. The information stored in a distributed file system is spread out over multiple, networked, computing devices and is usually made available to multiple client devices. A distributed file system keeps the stored information consistent by coordinating access to the information when multiple devices wish to access, and to potentially change, the information. However, when distributed file systems perform operations directly on the client devices that initiate the operations, rather than sending each operation individually back to a central server for remote processing, this can presents a problem in keeping the file system data consistent. For instance, if two clients make conflicting changes to the file system state at the same time, then the file system enters an inconsistent state. A state of a file system is the condition of the file system consistency. One approach to this problem is to create resolution mechanisms that attempt to rectify inconsistencies after they occur. Thus, the distributed file system is allowed to enter an inconsistent state and is subsequently corrected, to whatever extent that is possible.

A consistency management framework (CMF) is composed of a consistency manager that provides operations for acquiring, returning, revoking, and relinquishing state guarantees of a file system. A consistency manager allows the coordination and communication of consistency state residing within each participating distributed file system. The advantage to using the consistency management framework is its ability to map and coordinate the state mechanisms of multiple file system state managers in order to create an environment of unified state. While the consistency management framework allows the distributed file system client-server state-driven relationship to remain consistent with the underlying file system by way of the active relationship of the distributed file system server (CM client) and the consistency manager, when the distributed file system server becomes inactive, all state consistency with the consistency manager and also with the distributed file system clients is lost. A distributed file system server may become inactive when the distributed file system server is made inactive or shutdown on the server. In other words, the server operating system is still running, but the distributed file system is stopped. This stoppage of the file system server is usually performed by the system administrator of the server. This stoppage will break the active link between the client and the distributed file system server.

When all state consistency is lost, the distributed client-server system would attempt to reacquire all previous state, and then use additional distributed file system change detection techniques to determine if the prior state held was still valid. However, in certain state circumstances, the client-server system may be unable to detect a violation of previous held state, and thus it must consider that state lost. For example, the file system server can grant WRITE delegations to a client, which means that the file system server is guaranteeing that no other entity will be able to READ or WRITE to the file as long as the client holds the WRITE delegation. In the case where the client is granted a WRITE delegation on file X, the file system server becomes inactive, and the file X is read (but not modified) by way of a local file system access path outside of the file system server. When the file system server becomes active, the client-server will be unable to detect that an unauthorized access to file X had occurred. In this case, since the violation cannot be detected, the client-server will need to lose/destroy all state on file X to avoid any data inconsistencies.

SUMMARY OF THE INVENTION

The illustrative embodiments provide a computer implemented method, data processing system, and computer program product for maintaining state consistency among multiple state-driven file system entities when the file system entities become disconnected. Responsive to a distributed file system server being disconnected from a distributed file system client, a monitor is registered with the consistency management framework (CMF) for a file system. When the CMF detects access to a file in the file system, the CMF notifies the monitor of the access to the file, and the monitor stores information about state of the file. When the distributed file system server is reconnected to the distributed file system client, information about state of the file stored in the monitor is provided to the distributed file system client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of a process for maintaining state consistency among multiple state-driven file system entities when the file system entities become disconnected in accordance with the illustrative embodiments.

DETAILED DESCRIPTION OF THE PREFERRED EMBODIMENT

Figure 1:
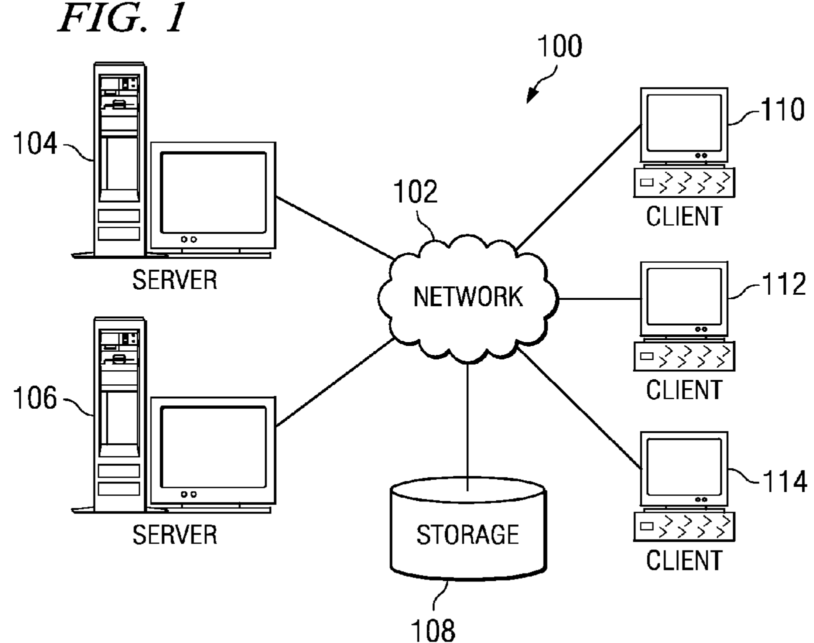
FIG. 1 depicts a pictorial representation of a distributed data processing system in which the illustrative embodiments may be implemented.
Figure 2:
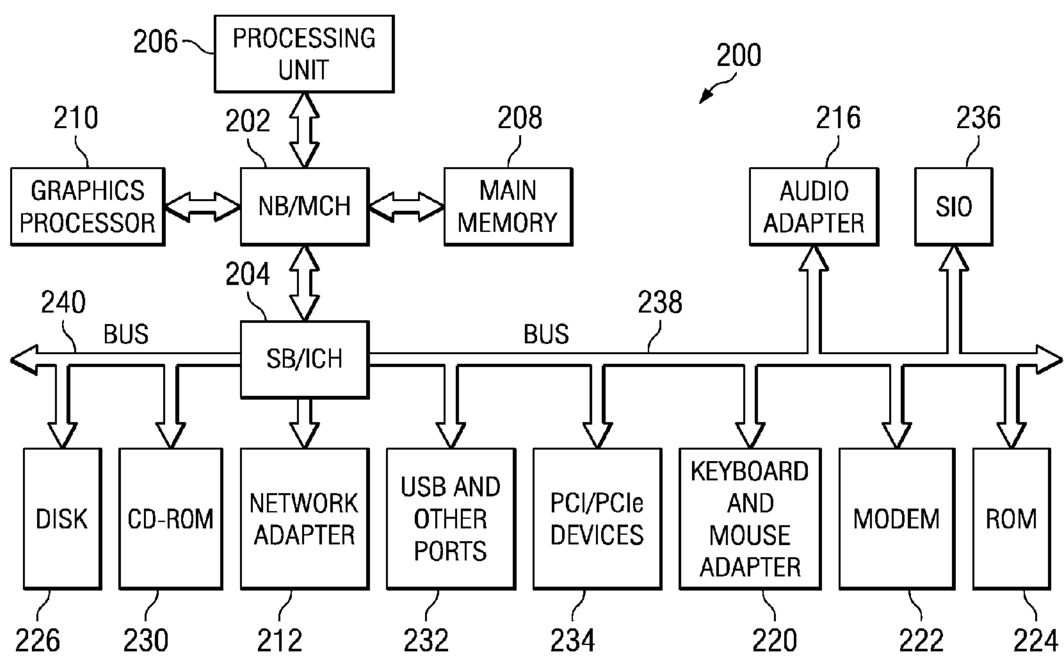
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, applications, and other data files to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, data processing system, and computer program product for maintaining state consistency among multiple state-driven file system entities. With the illustrative embodiments, the consistency between state-driven file system entities, such as between a distributed file system client and a distributed file system server, may be preserved when the distributed file system server is disconnected (inactive). In this manner, the disconnected file system entities may reconcile state after re-connection.

In particular, the illustrative embodiments build upon features in the existing consistency management framework and extend the capabilities of the framework to maintain state consistency due to a disconnect event. In a consistency management framework, the file systems that employ consistency manager services are broken into two categories—consistency management clients and consistency management peers. Consistency management clients are the server components of a distributed file system (i.e., distributed file system servers) that need to access or store file system data on behalf of their client constituents (i.e., distributed file system clients). Consistency management peers are the providers that control access to the actual underlying storage. Consistency management peers are the logical owners of the storage and the data contained within it. Consistency management peers service requests from consistency management clients to read or write file system data.

With the illustrative embodiments, one or more monitors are provided within the consistency management framework to preserve consistency between state-driven file system entities. Each monitor comprises a state matrix corresponding to its respective consistency management client (distributed file system server) in the consistency management framework. A monitor will monitor a file system to identify state changes for the consistency management client while the consistency management client is disconnected. Since state models vary greatly within each consistency management client, each monitor within the consistency management framework may be tailored for the given state matrix of the consistency management client.

To preserve consistency during a disconnect event, the monitor first registers with the consistency manager as monitoring a targeted file system(s). When the consistency manager detects access to the targeted file system(s), the registered monitor is notified of the access. The monitor then interrogates its internal state matrix with the given access. Upon reconnecting the previously disconnected consistency management client, the state matrix of the re-connected consistency management client is reconciled with the internal state matrix of the monitor. Consequently, the consistency management client may determine with certainty which elements of its state matrix remain consistent after a disconnect event.

Figure 3:
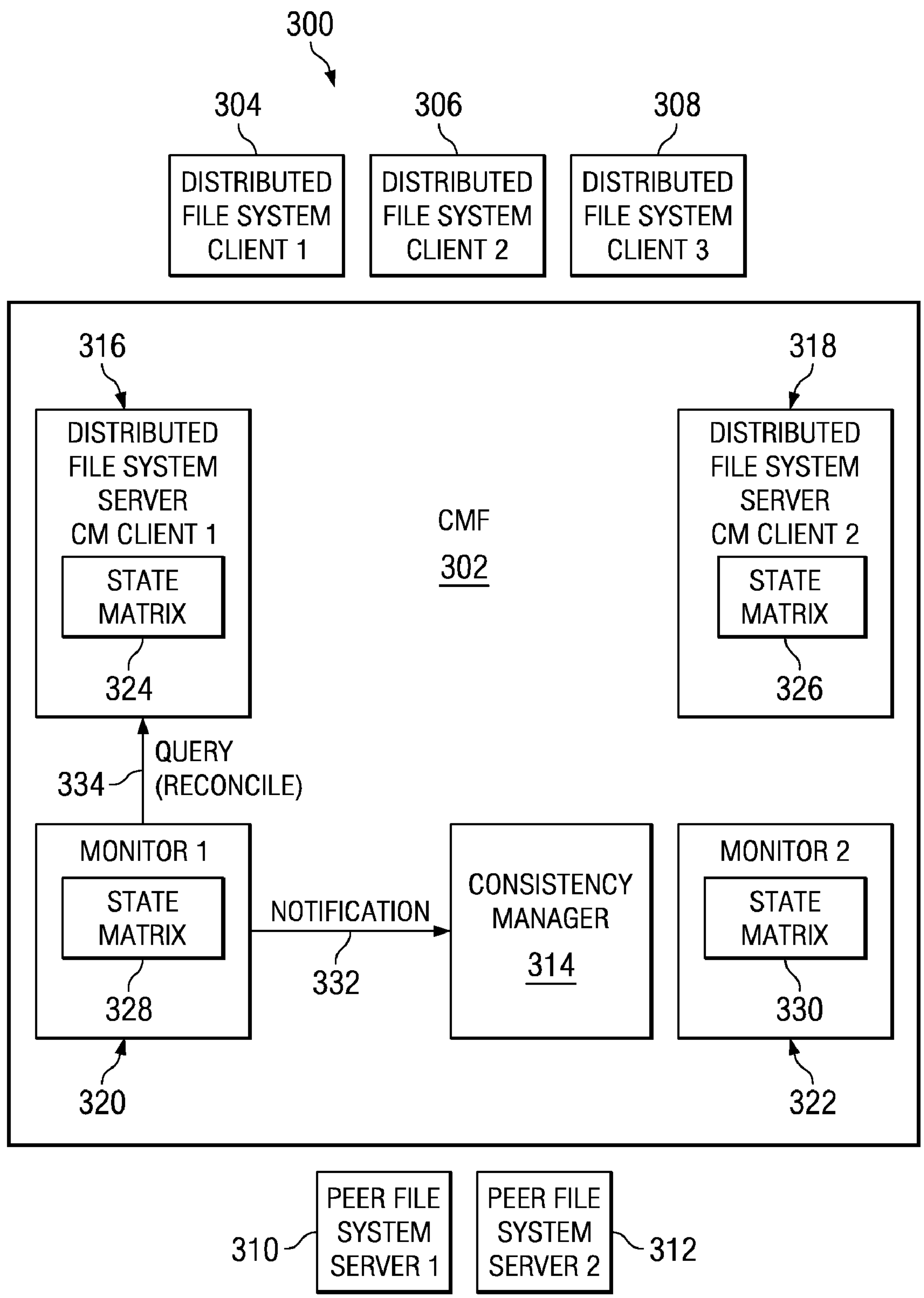
FIG. 3 is a block diagram of a file system comprising a consistency management framework in accordance with the illustrative embodiments.

FIG. 3 is a block diagram of a file system comprising a consistency management framework in accordance with the illustrative embodiments. File system 300 may be implemented in a distributed network, such as network data processing system 100 in FIG. 1. In this illustrative example, file system 300 includes consistency management framework (CMF) 302, distributed file system clients 304-308, and peer file system servers 310 and 312.

Consistency management framework 302 comprises a consistency manager 314 that provides operations for acquiring, returning, revoking, and relinquishing state guarantees of a file system. Consistency manager 314 allows the coordination and communication of consistency state residing within each participating distributed file system. Consistency management framework 302 also includes various distributed file system servers, such as consistency management (CM) client 316 and 318, and various monitors, such as monitor 320 and monitor 322.

CM clients 316 and 318 are the server components of the distributed file system (i.e., distributed file system servers) that need to access or store file system data on behalf of their client constituents (distributed file system clients 304-308). CM peer file system servers 310 and 312 are the providers that control access to the actual underlying storage. Peer file system servers 310 and 312 are the logical owners of the storage and the data contained within it. Peer file system servers 310 and 312 service requests from CM clients to read or write file system data.

Consistency manager 314 provides a set of services to CM clients 316 and 318. This set of services allow CM clients 316 and 318 to establish, indirectly, relationships with peer file system servers 310 and 312 and their state mechanisms. The set of services also allow CM clients 1 316 and 2 318 to register their interest in acquiring consistency rights. Consistency rights represent guarantees covering state aspects of the participating distributed file systems that comprise CM clients and peer file system servers. The actual defined rights are dependent on the implementation of the described consistency management framework 302. For example, a set of rights may include open_read, open_write, open_deny_read, open_deny_write, read_data_range, and write_data_range. Within the set of defined consistency rights, an implementation may establish conflict rules. These rules define rights that must be recalled in order to grant a pending rights request. Consistency management framework 302 provides mechanisms to issue recalls (revocations) of rights when such conflicts arise. The set of services further allow CM clients 316 and 318 to obtain consistency rights from consistency manager 314, as well as receive and process recalls of consistency rights by consistency manager 314.

Consistency manager 314 also provides a set of services to peer file system servers 310 and 312. This set of services allow peer file system servers 310 and 312 to register a peer's support for consistency management functions, participate in consistency management processing of rights requests through peer-provided methods, and issue recalls of rights previously granted to consistency manager 314 by the particular peer file system server.

CM clients 316 and 318 register with consistency management framework 302 to indicate their need to coordinate state with other CM clients and underlying storage mechanisms. For instance, when CM client 316 needs to create state and distribute it to its constituents (i.e., distributed file system clients 304, 306, and/or 308), CM client 316 obtains corresponding rights from consistency manager 314. Consistency manager 314 checks for conflicts with rights held by other CM clients (e.g., CM client 318) and issues revocations as needed to resolve conflicts before returning rights to calling CM client 316. Consistency checks are also made with registered peer file system servers 310 and 312 as needed before returning the rights to calling CM client 316.

If a conflicting request arrives from another CM client or, in the case of an involved peer file system server, conflicting operations occur within the peer's environment, a CM client holding rights may receive a recall (revoke) of those rights from consistency manager 314. The CM client handles the revoke by resolving conflicting state within its environment in order to free its need for the revoked CM consistency right. The CM client then relinquishes the revoked consistency right. Depending on the defined consistency rights and the implementation of the consistency management framework, the model may allow for the CM client to refuse the revoke.

To preserve consistency between the file system entities (e.g., the distributed file system clients, CM clients, and the peer file system servers), monitors, such as monitor 1 320 and monitor 2 322, are also provided within the existing consistency management framework 302. CM clients 316 and 318 each comprise a state matrix 324 and 326. A state matrix is a data set that describes what "state" is currently held by the file system server. This state would be broken down for each file system served by the file system server, then for each file system object (file) for which state is held, and then for the type of state held on that object/file (e.g., READ access, WRITE, READ-WRITE, object READ, object WRITE). Object READ and WRITE are also referred to as delegations—they are guarantees. Object 'READ right' specifies that as long as the file system server has that right on the file, then no other entity is able to WRITE to it. The right is guaranteed not to change as long as the right is held. Also, an indicator in the state matrix for each file may be used to indicate whether or not locks were held on the file, as well as access counts on the file. In this example, monitors 320 and 322 also comprise a state matrix 328 and 330. Each monitor may be configured for the given state matrix of a CM client.

The monitor framework comprises two parts—notification 332 and query 334. In this illustrative example, monitor 1 320 monitors the file system to identify state changes for CM client 316 while the CM is disconnected. For notification 332, monitor 320 registers with consistency manager 314 as a monitor of the file system. When consistency manager 314 detects access to the file system, consistency manager 314 notifies monitor 320 that the file system has been accessed. Monitor 320 updates its state matrix 328 with the access information. Consider, for example, a case where the state matrix indicates that on file system V, file X has READ, object READ, and a lock on the file. If the monitor is notified of a WRITE access, the state matrix would be updated that the object READ right is no longer valid. Alternatively, the monitor may update the state matrix to reflect that all state of file X is no longer valid.

For query 334, previously disconnected CM client 316 is reconnected. Monitor 320 then reconciles the state matrix 324 of CM client 316 with the state matrix 328 of monitor 320. For instance, when the file system server and the client become reconnected, CM client 316 may request a RECLAIM of state for certain rights (e.g., READ, WRITE, object READ, etc). At this point, the file system server queries updated state matrix 328 of monitor 320. Using the example in the paragraph above, CM client 316 would request RECLAIM for file system V, file X, and object READ. Monitor 320 is checked and would indicate to the file system server that the right is no longer valid. The file system server subsequently indicates to CM client 316 that the RECLAIM request cannot be granted. By using monitor 320 to monitor access to the file system while CM client 316 is disconnected, CM client 316 may use the state information provided by monitor 320 to determine which elements of its state matrix 324 remain consistent after the disconnect event.

FIG. 4 is a flowchart of a process for maintaining state consistency among multiple state drive file system entities when the file system entities become disconnected in accordance with the illustrative embodiments. The process described in FIG. 4 may be implemented in a file system, such as file system 300 in FIG. 3.

The process begins when the distributed file system server establishes itself as a client of the configuration management framework for a given file system and/or set of file systems (step 402). The distributed file system clients acquire state from the file system server, and an active state matrix is created by this distributed client-server interaction (step 404). The file system server is then disconnected from the distributed file system clients (step 406). The following steps are performed at this point by the file system server: access/communication between the file system server and its clients is stopped (step 408), and the file system server registers a monitor(s) with the consistency management framework for the given file systems (or set of file systems) (step 410).

If the consistency management framework detects an access on a file system that has a monitor(s) registered for it, the consistency management framework then notifies each monitor indicating which file system was accessed, what type of access, and what file system object (file) is being accessed (step 412). It should be noted that the information provided from the consistency management framework to the monitor to indicate what access is occurring may range from very broad to very specific. Thus, while specific access information is used in the illustrative embodiments, any suitable access information may be provided to the monitor in accordance with the illustrative embodiments.

At this point, for the given file system, the monitor makes a determination as to whether the file system object being accessed has active state (step 414). If there is no active state ('no' output of step 414), then the monitor takes no action for this particular file system object (step 416), but continues monitoring the file system. Each access that results in the monitor being notified is treated independently of each other. The process then continues to step 422, when the file system clients and server are reconnected. At this point, the updates (or lack of updates) to the monitor's state matrix are checked when reclaim operations are performed.

Turning back to step 414, if the file does have active state ('yes' output of step 414), the monitor determines if the type of access will invalidate the active state (step 418). If the type of access invalidates the active state ('yes' output of step 418), then the monitor records in its state matrix that the active state is no longer valid (step 420). If the type of access does not invalidate the active state ('no' output of step 418), the monitor takes no action for this particular file system object (step 416), but continues monitoring the file system. The process then continues to step 422, when the file system clients and server are reconnected. For certain type of file system access, it may be necessary to invalidate all active state for the file system. In this case, all active state for all the files associated with the file system would be marked as no longer valid in the state matrix.

When the file system server is made active again, the distributed file system clients may access/communicate with the file system server (step 422). The distributed file system clients detect that the file system server is now active and begin the reclamation of state process as determined by the distributed file system protocol (step 424). The reclamation of state process comprises reconciling information in the state matrix of the monitor with the information in the state matrix of the file system server. When the distributed file system client requests reclamation of state for a given file within a file system, the file system server queries the monitor's state matrix to determine if the reclaim access is allowed (step 426). If the reclaimed access is allowed ('yes' output of step 426), the reclaim request is granted (step 428). Otherwise ('no' output of step 426), the reclaim request is denied (step 430).

When the distributed file system recovery period has ended, the file system server unregisters the monitor(s) with the consistency management framework (step 432), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for maintaining state consistency among multiple state-driven file system entities in a consistency management framework, the computer implemented method comprising:

responsive to a distributed file system server being disconnected from a distributed file system client, registering, by a consistency manager, a monitor with the consistency management framework for a file system, wherein the monitor monitors the file system to identify state changes of files while the distributed file system server is disconnected from the distributed file system client;

responsive to the consistency manager detecting access to a file in the file system, notifying the monitor of the access to the file to cause the monitor to store information about a state of the file in a state matrix within a memory of the monitor, wherein the monitor determines if the file being accessed has an active state, determines if a type of the access will invalidate the active state if the file has an active state, and records that the active state is no longer valid in the state matrix if the type of the access invalidates the active state; and responsive to the distributed file system server being reconnected to the distributed file system client, providing the information about the state of the file stored in the state matrix of the monitor to the distributed file system client, wherein the information is provided as a response to a reclamation request from the distributed file system client for rights to the file, and wherein the reclamation request is granted if the information about the state of the file stored in the state matrix of the monitor is consistent with a state of the file stored in a state matrix within a memory of the distributed file system server.

2. The computer implemented method of claim 1, wherein prior to the distributed file system server being disconnected from the distributed file system client, the distributed file system server establishes itself as a client of the consistency management framework for the file system, the distributed file system client acquires state from the distributed file system server, and distributed client-server interaction creates an active state matrix.

3. The computer implemented method of claim 1, wherein disconnecting the distributed file system server from the distributed file system client causes the distributed file system server to stop communication between the distributed file system server and distributed file system client and register the monitor with the consistency management framework for the file system.

4. The computer implemented method of claim 1, wherein notifying the monitor of the access to the file includes notifying the monitor of the type of access and the file system object being accessed.

5. The computer implemented method of claim 1, wherein reconnecting the distributed file system server to the distributed file system client allows the distributed file system client to communicate with the distributed file system server and detect that the file system server is active.

6. The computer implemented method of claim 5, wherein the information about state of the file stored in the monitor is provided to the distributed file system client in response to a reclamation request by the distributed file system client to the distributed file system server.

7. The computer implemented method of claim 6, wherein the reclamation request is granted if the monitor grants reclaim access to the distributed file system client.

8. The computer implemented method of claim 5, further comprising:

responsive to reconnecting the distributed file system server to the distributed file system client, unregistering the monitor with the consistency management framework for the file system.

9. A data processing system for maintaining state consistency among multiple state-driven file system entities in a consistency management framework, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to register a monitor having memory with the consistency management framework for a file system in response to a distributed file system server being disconnected from a distributed file system client, wherein the monitor monitors the file system to identify state changes of files while the distributed file system server is disconnected from the distributed file system client; notify, in response to detecting access to a file in the file system, the monitor of the access to the file to cause the monitor to store information about a state of the file in a state matrix within a memory of the monitor, wherein the monitor determines if the file being accessed has an active state, determines if a type of the access will invalidate the active state if the file has an active state, and records that the active state is no longer valid in the state matrix if the type of the access invalidates the active state; and provide the information about the state of the file stored in the state matrix of the monitor to the distributed file system client in response to the distributed file system server being reconnected to the distributed file system client, wherein the information is provided as a response to a reclamation request from the distributed file system client for rights to the file, and wherein the reclamation request is granted if the information about the state of the file stored in the state matrix of the monitor is consistent with a state of the file stored in a state matrix within a memory of the distributed file system server.

10. A computer program product for maintaining state consistency among multiple state-driven file system entities in a consistency management framework, the computer program product comprising:

a non-transitory computer readable storage medium having computer usable program code stored thereon, the computer usable program code comprising:

computer usable program code for registering a monitor with the consistency management framework for a file system in response to a distributed file system server being disconnected from a distributed file system client, wherein the monitor monitors the file system to identify state changes of files while the distributed file system server is disconnected from the distributed file system client;

computer usable program code for notifying, in response to detecting access to a file in the file system, the monitor of the access to the file to cause the monitor to store information about state of the file in a state matrix within a memory of the monitor, wherein the monitor determines if the file being accessed has an active state, determines if a type of the access will invalidate the active state if the file has an active state, and records that the active state is no longer valid in the state matrix if the type of the access invalidates the active state; and computer usable program code for providing the information about the state of the file stored in the state matrix of the monitor to the distributed file system client in response to the distributed file system server being reconnected to the distributed file system client, wherein the information is provided as a response to a reclamation request from the distributed file system client for rights to the file, and wherein the reclamation request is granted if the information about the state of the file stored in the state matrix of the monitor is consistent with a state of the file stored in a state matrix within a memory of the distributed file system server.

11. The computer program product of claim 10, wherein prior to the distributed file system server being disconnected from the distributed file system client, computer usable program code is executed for enabling the distributed file system server to establish itself as a client of the consistency management framework for the file system, for enabling the distributed file system client to acquire state from the distributed file system server, and for enabling distributed client-server interaction to create an active state matrix.

12. The computer program product of claim 10, wherein the disconnecting of the distributed file system server from the distributed file system client causes computer usable program code to be executed to enable the distributed file system server to stop communication between the distributed file system server and distributed file system client and register the monitor with the consistency management framework for the file system.

13. The computer program product of claim 10, wherein the computer usable program code for notifying the monitor of the access to the file includes notifying the monitor of the type of access and the file system object being accessed.

14. The computer program product of claim 10, wherein the computer usable program code for reconnecting the distributed file system server to the distributed file system client allows the distributed file system client to communicate with the distributed file system server and detect that the file system server is active.

15. The computer program product of claim 14, further comprising:

computer usable program code for providing the information about state of the file stored in the monitor to the distributed file system client in response to a reclamation request by the distributed file system client to the distributed file system server; and computer usable program code for granting the reclamation request if the monitor grants reclaim access to the distributed file system client.

16. The computer program product of claim 14, further comprising:

computer usable program code for unregistering the monitor with the consistency management framework for the file system in response to reconnecting the distributed file system server to the distributed file system client.

* * * * *